United States Patent
Eustache

(10) Patent No.: US 6,532,616 B1
(45) Date of Patent: Mar. 18, 2003

(54) MOTOR VEHICLE WIPER DEVICE COMPRISING A FIXING PLATE

(75) Inventor: Jean-Pierre Eustache, Antony (FR)

(73) Assignee: Systemes d'Essuyage et Moteurs Electriques, Z.A. de l'Agiot (FR)

( * ) Notice: Subject to any disclaimer, the term of this patent is extended or adjusted under 35 U.S.C. 154(b) by 0 days.

(21) Appl. No.: 09/403,857
(22) PCT Filed: Feb. 26, 1999
(86) PCT No.: PCT/FR99/00443
§ 371 (c)(1),
(2), (4) Date: Dec. 27, 1999
(87) PCT Pub. No.: WO99/43521
PCT Pub. Date: Sep. 2, 1999

(30) Foreign Application Priority Data

Feb. 27, 1998 (FR) .............................. 98 02387

(51) Int. Cl.⁷ ............................... B60S 1/06; B60S 1/18
(52) U.S. Cl. ................ 15/250.31; 15/250.3; 296/96.17; 296/189; 248/900; 403/DIG. 3
(58) Field of Search ........................... 15/250.3, 250.31, 15/250.27; 296/96.17, 189; 248/900, 214, 205.1; 403/DIG. 3

(56) References Cited

U.S. PATENT DOCUMENTS

| | | | | |
|---|---|---|---|---|
| 5,706,547 A | * | 1/1998 | Kobayashi ................. | 15/250.3 |
| 5,836,042 A | * | 11/1998 | Funk et al. ................. | 15/250.3 |
| 6,101,664 A | * | 8/2000 | Egner-Walter et al. .... | 15/250.3 |
| 6,216,309 B1 | * | 4/2001 | Goto et al. .............. | 15/250.31 |

FOREIGN PATENT DOCUMENTS

| | | | | |
|---|---|---|---|---|
| DE | 4328652 A1 | | 3/1995 | |
| JP | 5-32153 | * | 2/1993 | ................. 15/250.3 |

OTHER PUBLICATIONS

Patent Abstracts of Japan, vol. 011, No. 316 (M–631), Oct. 15, 1987, & JP 62 099244 A (Mazda Motor Corp.), May 8, 1987.

* cited by examiner

Primary Examiner—Gary K. Graham
(74) Attorney, Agent, or Firm—J. Gordon Lewis

(57) ABSTRACT

The invention concerns a wiper device comprising at least a plate guiding in rotation and fixing a shaft extending axially (X—X) outwards by its free end wherein the plate comprises a stem in which the driving shaft is guided in rotation and a transverse sole plate for fixing it on the vehicle body via a shock-absorbing unit. The invention is characterized in that the shock-absorbing unit is mounted in a housing matching the sole plate partially open along a direction substantially parallel to the driving shaft axis (X—X) to enable, in case of a violent impact, the shock-absorbing unit to be released from its housing thereby causing the axial retraction of the sole plate, the guide stem and the driving shaft.

5 Claims, 3 Drawing Sheets

MOTOR VEHICLE WIPER DEVICE COMPRISING A FIXING PLATE

BACKGROUND OF THE INVENTION

This invention concerns a wiping device for motor vehicles.

The invention concerns, more specifically, a motor vehicle wiping device including at least a member guiding in rotation and fixing a shaft which extends axially outwards such that the free end of the shaft guides a wiper in an alternating sweeping motion, The member contains a stem in which the driving shaft is guided in rotation, and a transverse sole plate, or handle, for its fixation on the body of the vehicle via a shock-absorbing unit in an elastic, moldable material. Such a plate constitutes a traditional mechanism of fastening the wiping device on the body of the vehicle.

In case of a collision with a pedestrian, the part of the wiper mechanism which extends outside the vehicle creates a blunt object which creates the risk of causing injuries. One has also remarked that in the case of a violent accident the wiping device, which is attached in the engine near the passenger compartment, could penetrate the interior of the passenger compartment by the opening of the windshield under the effect of a shock. The accidental intrusion of an element so big reveals itself as dangerous for the security of the passengers and it is, therefore, necessary to better predict the behavior of the wiping device in case of a violent shock.

SUMMARY OF THE INVENTION

In order to remedy these inconveniences, the invention proposes a wiping device of the type previously described, characterized by the shock-absorbing unit being mounted in a housing matching the sole plate, or the body of the vehicle, which is partially open in a direction substantially parallel to the axis of the driving shaft in order to allow, in case of violent impact, the shock-absorbing unit to be released from its housing to obtain axial retraction of the sole plate, the guide stem, and the driving shaft.

According to other characteristics of the invention:

the sole plate is in the shape of a plate and extends in a plane parallel to the axis of the driving shaft;

the housing is formed in the sole plate in the shape of a contoured circular cut which is open radially in the direction from a side of the sole plate;

the shock-absorbing unit is attached to the body of the vehicle, or the sole plate by a fastening rod reaching in a direction perpendicular to the axis of the driving shaft;

the fastening rod contains a crumple zone in a small resistant section; and the member is created as one piece, i.e., by casting.

The invention also covers a member conforming to the specifications of the invention.

BRIEF DESCRIPTION OF THE DRAWINGS

The other characteristics and advantages will be apparent in the reading of the detailed description which follows and for which one should refer to the attached drawings in which:

FIG. 4 is a similar view to that of FIG. 1 on which the driving shaft, the member and the sole plate arc illustrated in the axially retracted position.

DESCRIPTION OF THE PREFERRED EMBODIMENT

Figure 1:
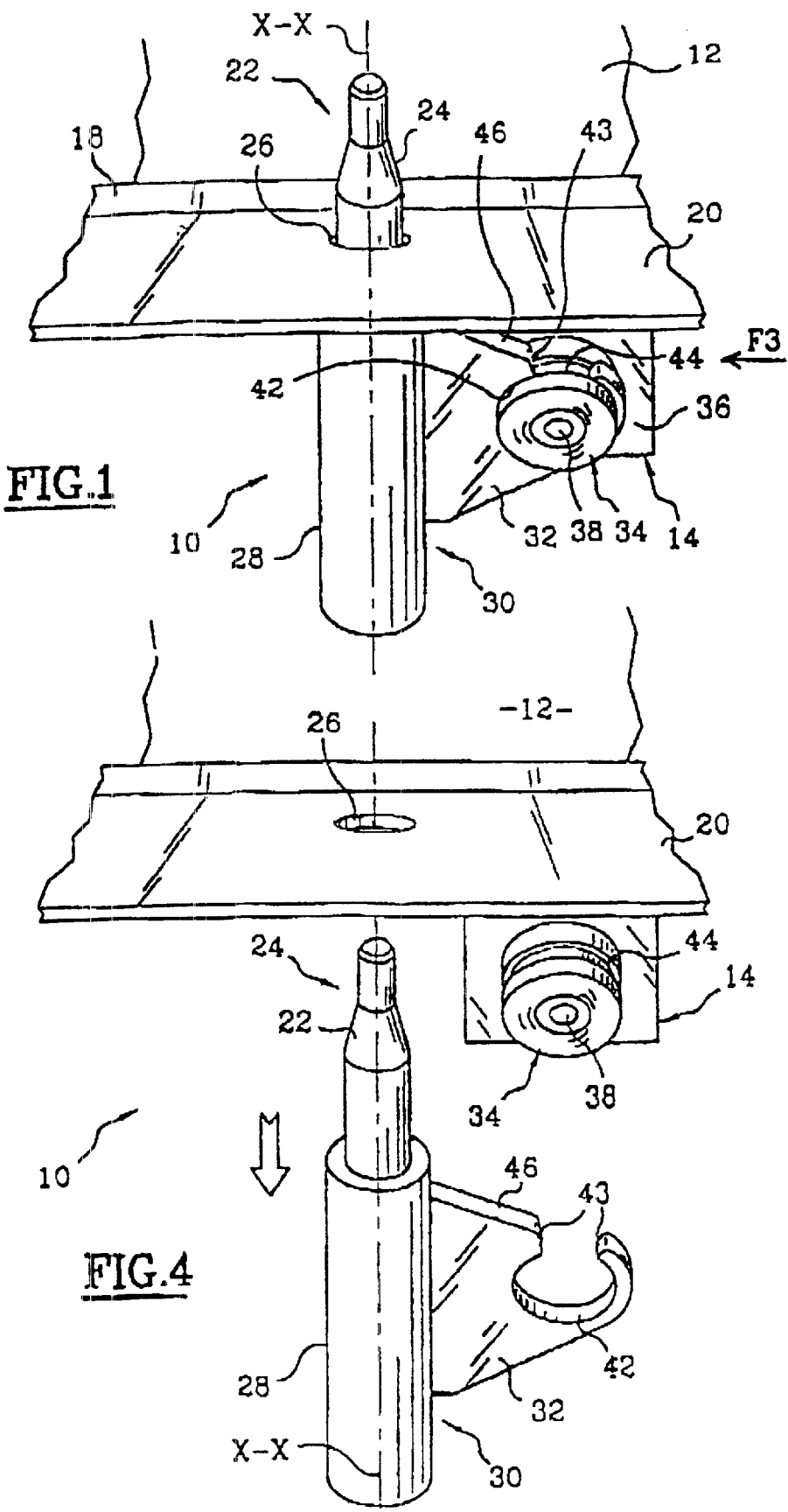
FIG. 1 is a schematic perspective view, according to arrow F1 in FIG. 3, which illustrates an example of a wiping device conforming to the specifications of the invention.

Represented in FIGS. 1–4 are certain components belonging to a device 10 for wiping a window 12, like a windshield of a motor vehicle or a rear window. The windshield 12 is mounted on the body of an automobile, which is represented in the drawing as a hollow structural element 14 in the form of a crosspiece which contains a ledge 16 upon which rests the window of the windshield 12 which is also received between a bent edge 18 opposite from a piece of sheet metal 20.

The wiping device 10 contains a rotating stem 22 of a commonly understood design, the upper free end 24 of which is vertically projected on the exterior across a hole 26 in the sheet metal 20 and is designed to receive a wiper arm (not represented) that it turns in rotation in order to provoke an alternating sweeping motion of the window 12 by the wiper.

The driving shaft 22 is mounted in rotation, around its axis X—X, in a guide stem 28 of a commonly understood design which is illustrated schematically and which belongs to a member 30 of the wiping device.

Other than the stem 28, the member 30 contains a sole plate 32 to fasten the device 10 on the structural element 14 of the vehicle body. The plate 32 is an element in the form of a plate, which is, for example, created out of a material by casting with the stem 28 and which extends in a plane which is parallel to the axis X—X of rotation of the driving shaft 22 (see FIG. 3.)

According to a generally understood design, in order to soften vibrations, the sole plate 32 is fastened to the structural element 14 by means of a shock-absorbing unit 34 which is, for example, a generally cylindrical shaped unit made of elastomer material. The unit 34 extends along an axis Y—Y substantially perpendicular to the plane of the sole plate 32 and to the plane of the support face 36 belonging to the structural element 14. The shock-absorbing unit 34 can be fastened to the element 14 by any known means.

It is notable to create the unit 34 in the form of an element made of an elastomer material molded around an axial fastening rod 38, the body of which (not represented in the drawing) crosses a hole complimentary to the face 36 and presents a free, threaded end which is mounted or screwed into an internal soldered nut 40 of the structural element 14.

Conforming to the specifications of the invention, the shock-absorbing unit 34 includes mounted in a housing 42 matching the sole plate 32. More precisely, the housing 42 includes a circular hole, the dimensions of which correspond to those of a groove 44 formed in the lateral cylindrical wall 35 of the shock-absorbing unit 34.

Conforming to the specifications of the invention, the hole or housing 42 is radially open towards the exterior, that is to say, that it dislodges from its opening 43 in an edge 46 of the plate forming the sole plate 32.

Figure 2:
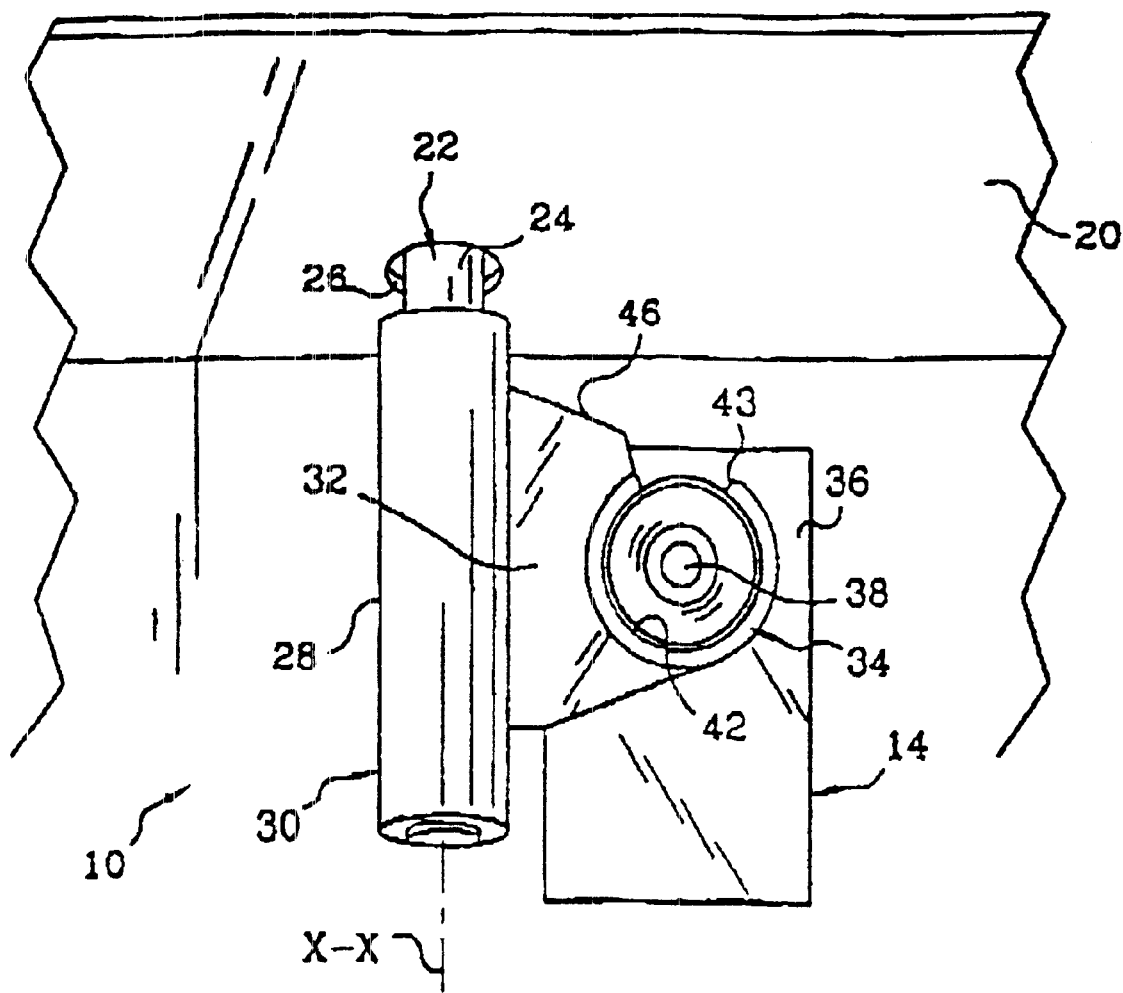
FIG. 2 is a similar view to that in FIG. 1 according to arrow F2 in FIG. 3.

As one can see more particularly in FIGS. 2 and 4, the circular housing 42 is open in a direction parallel to the axis X—X and in the direction of the free upper end 24 of the driving shaft 22.

The dimensions of the opening 43 of the circular housing 42 are such that it allows a part of the setting to force according to the radial direction and by compression of the elastomer material making up the shock-absorbing unit 34 in the housing 42, in order to allow the fastening of the sole plate 32 and of the member 30 by means of the screw 38 on the structural element 14.

Figure 3:
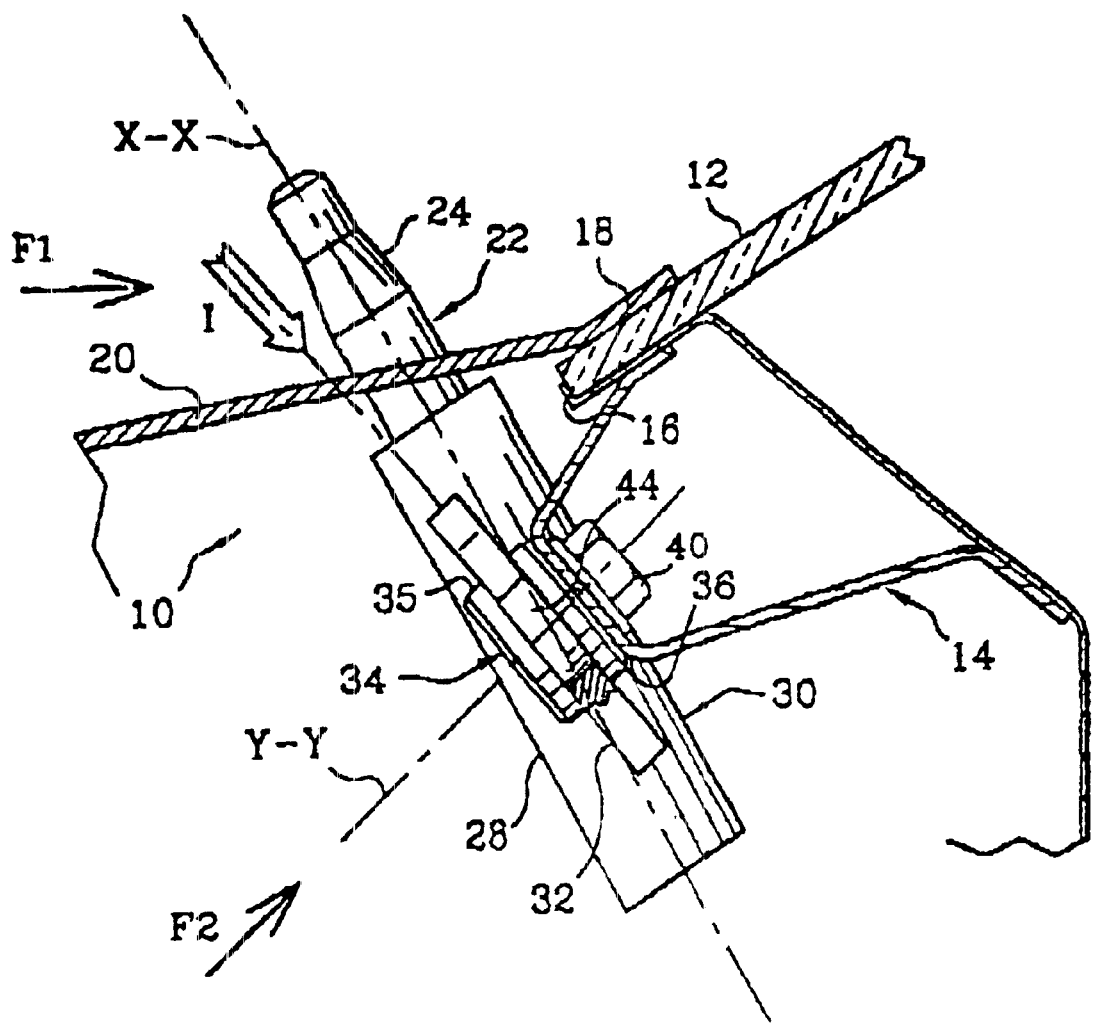
FIG. 3 is a lateral view of a partial section, according to arrow F3 in FIG. 1.

The dimensions of the opening 43 and the conception of shock-absorbing unit 34 also allow, conforming to the specifications of the invention, dislodging the shock-absorbing unit 34 from its housing 42 in case of impact on the transmission shaft 24, that is to say, in case of impact applied to its free upper end 24 on the whole according to direction 1 indicated on FIG. 3. This type of impact occurs notably in case of a collision of the vehicle with a pedestrian, whose body crashes into the wiper and applies a direct impact on the wiper mechanism, and the plate 30 of which, in a direction parallel to the axis X—X and to the plane of the plate 32 leading to the release of the shock-absorbing unit 34 from the housing 42.

As a result of this release, the plate 30 is dislodged and can retract axially towards the interior so that the free end of the transmission shaft or stem 22, and the wiper with which it is equipped, no longer constitute a blunt object that could cause serious injuries.

According to another characteristic of the invention (not represented in the drawings), it is also possible to predict that the fastening rod 38 of the shock-absorbing unit 34 on the structural element 14 contains a crumple zone in a small resistant section in order to provoke another type of disconnection of the plate 30 in relation to the structural element 14, when the direction of the impact does not allow the unit 34 to escape by the opening 43 and/or in case of a collision between two vehicles, the absorbed energy provokes the rupture of the rod 38 in order to avoid the entire wiper device penetrating the passenger compartment of the vehicle.

What is claimed is:

1. A wiping device for a motor vehicle containing at least one member engaged with a driving shaft which extends axially towards an exterior of the vehicle such that its free end guides a wiper in an alternating sweeping motion, of a type in which the member contains a guide stem in which the driving shaft is guided in rotation, and a sole plate for its fastening onto a body of the vehicle by means of a shock-absorbing unit in an elastically moldable material, characterized by the shock-absorbing unit being mounted in a matching housing of the sole plate which is partially open along a direction substantially parallel to an axis of the driving shaft to enable, in case of a violent impact, the release of the shock-absorbing unit from its housing to obtain axial retraction of the sole plate, the guide stem, and the driving shaft.

2. The device according to claim 1 characterized by the sole plate being in a shape of a plate and extending in a plane parallel to the axis of the driving shaft.

3. The device according to claim 2 characterized by the member being constructed as only one piece.

4. The device according to claim 1 characterized by the housing being formed in the sole plate in the form of a circular cut which is open radially in a direction of an edge of the sole plate.

5. The device according to claim 1 characterized by the shock-absorbing unit being attached to the vehicle body by a fastening rod, the fastening rod extending in a direction perpendicular to the axis of the driving shaft.

* * * * *